(12) United States Patent
Brown et al.

(10) Patent No.: US 9,921,879 B2
(45) Date of Patent: Mar. 20, 2018

(54) USING QUEUES CORRESPONDING TO ATTRIBUTE VALUES ASSOCIATED WITH UNITS OF WORK TO SELECT THE UNITS OF WORK TO PROCESS

(71) Applicant: International Business Machines Corporation, Armonk, NY (US)

(72) Inventors: Theresa M. Brown, Tucson, AZ (US); Nicolas M. Clayton, Warrington (GB); Lokesh M. Gupta, Tucson, AZ (US); Theodore T. Harris, Jr., Tucson, AZ (US); Brian D. Hatfield, Tucson, AZ (US); Matthew Sanchez, Tucson, AZ (US); David B. Schreiber, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 138 days.

(21) Appl. No.: 14/277,018

(22) Filed: May 13, 2014

(65) Prior Publication Data

US 2015/0331710 A1    Nov. 19, 2015

(51) Int. Cl.
  *G06F 9/46* (2006.01)
  *G06F 9/50* (2006.01)
  *G06Q 10/06* (2012.01)
(52) U.S. Cl.
  CPC ............. *G06F 9/5027* (2013.01); *G06F 9/46* (2013.01); *G06Q 10/06* (2013.01); *G06F 2209/548* (2013.01)

(58) Field of Classification Search
  None
  See application file for complete search history.

(56) References Cited

U.S. PATENT DOCUMENTS 4,387,427 A  *  6/1983  Cox .................... G06F 9/468
                                                    718/102
5,937,428 A     8/1999  Jantz
(Continued)

FOREIGN PATENT DOCUMENTS

WO    2004109473    12/2004

OTHER PUBLICATIONS

Matta, I et al., "Differentiated Predictive Fair Service for TCP Flows", dated 2000, Computer Science Department Boston University, Boston, MA , Total 10 pgs.

(Continued)

*Primary Examiner* — Van Nguyen
(74) *Attorney, Agent, or Firm* — David W. Victor; Konrad Raynes Davda & Victor LLP

(57) ABSTRACT

Provided are a computer program product, system, and method for using queues corresponding to attribute values associated with units of work to select the units of work to process. A plurality of queues for each of a plurality of attribute types of attributes are associated with the units of work to process, wherein there are queues for different possible attribute values for each of the attribute types. A unit of work to process is received. A determination is made for each of the attribute types at least one of the queues corresponding to at least one attribute value for the attribute type associated with the received unit of work. A record for the received unit of work is added to each of the determined queues.

22 Claims, 8 Drawing Sheets

(56) References Cited

U.S. PATENT DOCUMENTS

| | | | | |
|---|---|---|---|---|
| 6,055,602 | A * | 4/2000 | McIlvain | G06F 3/0622 711/112 |
| 6,311,257 | B1 * | 10/2001 | Fitzgerald | G06F 3/0608 710/1 |
| 6,745,258 | B1 | 6/2004 | Pellegrino et al. | |
| 6,981,074 | B2 * | 12/2005 | Oner | G06F 13/28 370/218 |
| 6,985,900 | B2 * | 1/2006 | Codd | G06F 9/44 706/45 |
| 7,127,507 | B1 * | 10/2006 | Clark | H04L 43/045 709/224 |
| 7,302,448 | B2 * | 11/2007 | Schwendiman | G06F 9/44505 |
| 7,380,156 | B2 | 5/2008 | Rodrigues et al. | |
| 7,389,507 | B2 | 6/2008 | Dickson | |
| 7,499,951 | B2 * | 3/2009 | Mueller | G06Q 10/06 705/7.11 |
| 7,730,257 | B2 | 6/2010 | Franklin | |
| 7,765,549 | B1 * | 7/2010 | Lauer | G06F 9/5005 707/705 |
| 7,827,282 | B2 * | 11/2010 | Sorrentino | G06Q 10/06 709/223 |
| 7,840,526 | B1 | 11/2010 | Baltazar et al. | |
| 7,991,643 | B2 * | 8/2011 | Barsness | G06Q 10/06 705/26.1 |
| 8,127,305 | B1 * | 2/2012 | Leonard | G06F 9/546 709/226 |
| 8,230,426 | B2 | 7/2012 | Powers et al. | |
| 8,356,126 | B2 | 1/2013 | Ashmore | |
| 8,473,648 | B2 | 6/2013 | Chakhaiyar et al. | |
| 8,516,189 | B2 | 8/2013 | Sarkar | |
| 8,700,834 | B2 | 4/2014 | Horn et al. | |
| 8,751,861 | B2 | 6/2014 | Nair et al. | |
| 8,805,793 | B2 | 8/2014 | Patiejunas et al. | |
| 8,839,249 | B2 * | 9/2014 | Mills | G06Q 10/06 705/7.26 |
| 8,910,168 | B2 * | 12/2014 | Mital | G06F 9/46 718/101 |
| 9,268,503 | B2 | 2/2016 | Klemm et al. | |
| 2002/0178282 | A1 | 11/2002 | Mysore et al. | |
| 2004/0133680 | A1 * | 7/2004 | Sorrentino | G06Q 10/06 709/226 |
| 2005/0102398 | A1 | 5/2005 | Zhang et al. | |
| 2007/0050773 | A1 | 3/2007 | Tayyar et al. | |
| 2007/0133781 | A1 | 6/2007 | Febonio et al. | |
| 2008/0127191 | A1 * | 5/2008 | Barsness | G06Q 10/06 718/102 |
| 2011/0225583 | A1 * | 9/2011 | Suh | G06F 9/4887 718/1 |
| 2011/0286444 | A1 | 11/2011 | Petrovykh | |
| 2013/0125127 | A1 * | 5/2013 | Mital | G06F 9/46 718/102 |
| 2014/0189695 | A1 * | 7/2014 | Xu | G06F 9/52 718/102 |
| 2015/0277984 | A1 | 10/2015 | Abraham et al. | |

OTHER PUBLICATIONS

Motorola, Inc., et al., "QOS and Fairness for CDMA Packet Data", dated May 1, 2000, an IP.com Prior Art Database Technical Disclosure, Total 8 pages.

G. Castets, et al., "IBM TotalStorage Enterprise Storage Server PPRC Extended Distance", IBM Corp., Jun. 2002, Total 184 pages.

"A Method and System for the Optimal Background Copy via Adjusting PPRC Path Automatically", dated Jan. 26, 2012, an IP.com Prior Art Database Technical Disclosure, Total 6 pages.

US Patent Application for US Patent Application Serial No. Unknown, filed May 13, 2014, titled "Using Queues Corresponding to Attribute Values and Priorities Associated With Units of Work and Sub-Units of the Unit of Work to Select the Units of Work and Their Sub-Units to Process", by inventors T.M. Brown, et al., (18.533).

US Patent Application US Patent Application Serial No. Unknown, filed May 13, 2014, titled "Using Attribute Value Queues Corresponding to Attribute Values Associated With Units of Work and Sub-Units the Unit of Work to Select of the Units of Work and Their Sub-Units to Process", by inventors T.M. Brown, et al., (18.532).

Office Action dated Feb. 1. 2016, pp. 12 for U.S. Appl. No. 14/277,023, filed May 13, 2014, (18.532).

L. Wang, et al., "Influence of virtual networks to internet collective behavior", Acta Phys. Sin., 2007, 56(1): 36-42.

Notice of Allowance dated Aug. 12, 2016, pp. 44, for U.S. Appl. No. 14/277,026, filed May 13, 2014, 18.533.

Office Action dated Mar. 10, 2016, pp. 27, for U.S. Appl. No. 14/277,026, filed May 13, 2014, 18.533.

Thomasian, "Priority Queueing in Raid5 Disk Arrays with an NVS Cache", 1995 IEEE, pp. 168-172.

Zhenjie et al., "An Optimization Load Balancing Algorithm Design in Massive Storage System", 2009 IEEE, pp. 310-313.

Ming et al., "Queue Network Modeling Approach to Analysis of the Optimal Stripe Unit Size for Disk Arrays Under Schronous I/O Workloads", 2006 IEEE, 7 pages.

Response dated May 2, 2016, pp. 13, to Office Action dated Feb. 1, 2016, pp. 12 for U.S. Appl. No. 14/277,023, filed May 13, 2014, 18.532.

Notice of Allowance dated Jul. 1, 2016, pp. 14 for U.S. Appl. No. 14/277,023, filed May 13, 2014, 18.532.

Response dated Jun. 10, 2016, pp. 16, to Office Action dated Mar. 10, 2016, pp. 27, for U.S. Appl. No. 14/277,026, filed May 13, 2014, 18.533.

* cited by examiner

US 9,921,879 B2

USING QUEUES CORRESPONDING TO ATTRIBUTE VALUES ASSOCIATED WITH UNITS OF WORK TO SELECT THE UNITS OF WORK TO PROCESS

BACKGROUND OF THE INVENTION

1. Field of the Invention

The present invention relates to a computer program product, system, and method for using queues corresponding to attribute values associated with units of work to select the units of work to process.

2. Description of the Related Art

To perform work in a workload management environment, the workload manager may queue units of work in a work queue and then select the units of work from the queue to process. A workload process may search through the queued data to find a "best candidate" to process, using an algorithm to provide the required fairness. One drawback of this type of "best candidate" selection process is that it requires searching through large amounts of queued data looking for the "best candidate". Another aged selection criteria that may be used in conjunction with best candidate algorithm selects queued data that has been on the queue for an excessive duration. The combination of these two algorithms independently working on the queue may yield unpredictable selection results.

There is a need in the art for improved techniques for queuing units of work to process.

SUMMARY

Provided are a computer program product, system, and method for using queues corresponding to attribute values associated with units of work to select the units of work to process. A plurality of queues for each of a plurality of attribute types of attributes are associated with the units of work to process, wherein there are queues for different possible attribute values for each of the attribute types. A unit of work to process is received. A determination is made for each of the attribute types at least one of the queues corresponding to at least one attribute value for the attribute type associated with the received unit of work. A record for the received unit of work is added to each of the determined queues.

DETAILED DESCRIPTION

Described embodiments provide techniques for queuing units of work on multiple queues corresponding to attribute values associated with the units of work. A workload manager may then cycle through the queues to select units of work to process, where a unit of work may be selected for processing from any one of the multiple queues in which it is located. This allows for workload balancing based on different attribute values for different attribute types associated with a unit of work.

Figure 1:
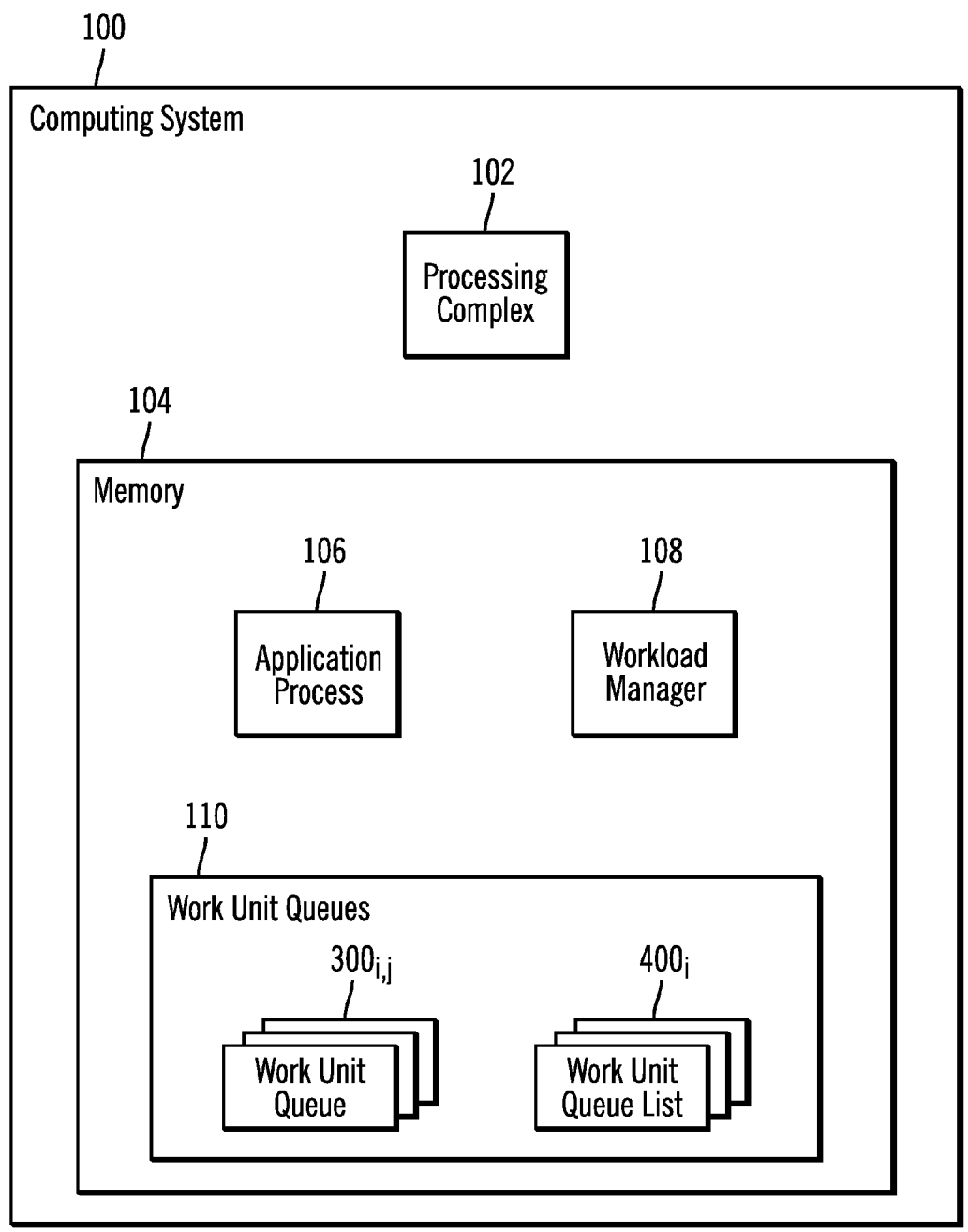
FIG. 1 illustrates an embodiment of a workload processing computing environment.

FIG. 1 illustrates an embodiment of a computing environment for processing units of work, including a computing system 100 having a processor complex 102, comprising one or more microprocessor units, and a memory 104. The memory 104 includes programs to execute, including an application process 106 that creates units of work to process that are submitted to a workload manager 108 to schedule the execution of the units of work from the application process 106. The workload manager 108 may invoke additional processes to process the units of work.

The units of work to process may comprise a computing task, application operation, storage access operation, database access operation, data movement operation, or any other type of computing operation with respect to data and computing resources. Each unit of work may be associated with a plurality of attributes for the unit of work, such as a device that would be used to process the unit of work (e.g., memory, storage, adapters, processors, etc), customers or users associated with the unit of work, resources that would be allocated to the unit of work, etc.

To balance processing of units of work according to the different attribute values of attribute types associated with the unit of work, the workload manager 108 may maintain a plurality of queues $300_{i,j}$ for the different attribute types 1 . . . n. In one embodiment, for each attribute type i, there may be one queue for each attribute value j that may be assigned for the attribute type i. This allows one queue for each work unit attribute value that may be assigned to the unit of work, to allow queuing by attribute type i and attribute value j. The workload manager 108 may then balance selection of queued units of works from the queues $300_{i,j}$ to balance unit of work selection by attribute values associated with the units of work.

Figure 2:
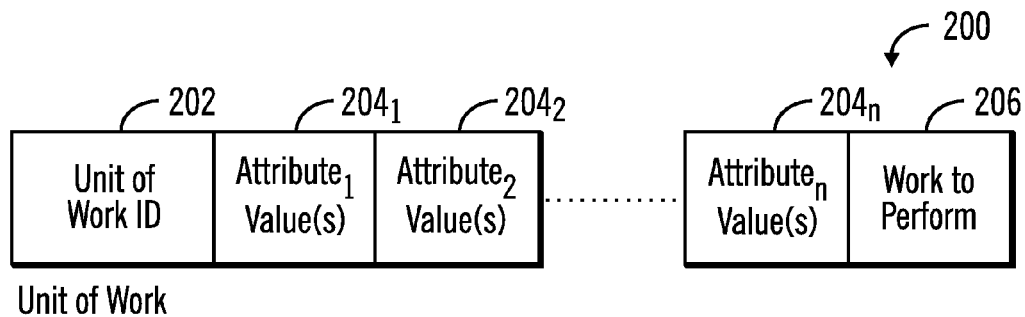
FIG. 2 illustrates an embodiment of a representation of a unit of work to process.

FIG. 2 illustrates an embodiment of a unit of work 200 including information and metadata on the unit of work to process, including a unit of work identifier (ID) 202, one or more attribute values associated with the unit of work for each attribute type $204_1$ . . . $204_n$, and the work to perform 206, which may provide the necessary information needed by the work unit execution process 106 to process the unit of work, like operation to perform, pointer to operation, code to execute, data transfer operation to perform, etc.

Figure 3:
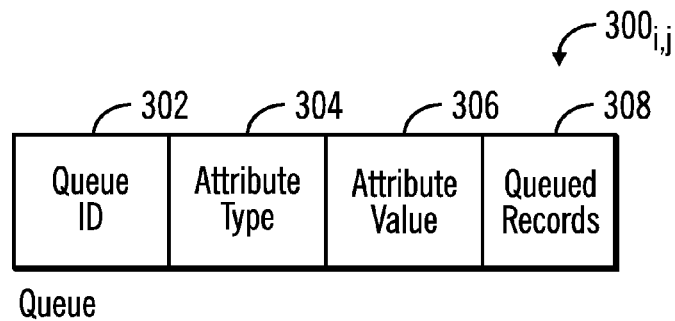
FIG. 3 illustrates an embodiment of a queue.

FIG. 3 illustrates an embodiment of a queue $300_{i,j}$, for attribute type i and attribute value j, which includes a queue ID 302, an attribute type 304, an attribute value 306 associated with the queue 302, and queued records 308 in the queue $300_{i,j}$. Thus, there may be multiple queues, one for each of the attribute values j for the attribute type i. Each record in the queue 308 identifies a unit of work 200 to process. The workload manager 108 may always go to process the first record in the queue $300_{i,j}$, where the queue may be ordered according to a basis, such as last in first out (LIFO).

Figure 4:
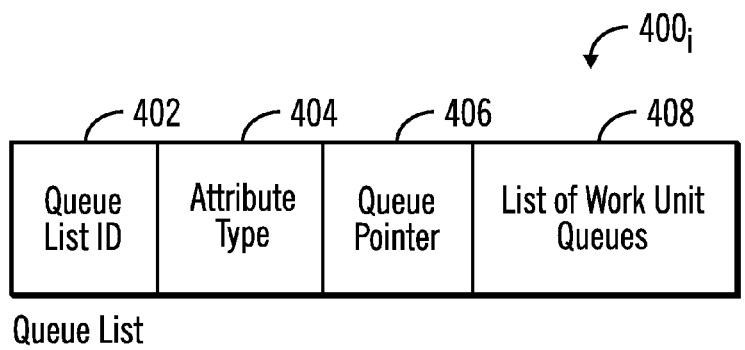
FIG. 4 illustrates an embodiment of a queue list.

FIG. 4 illustrates an embodiment of a queue list $400_i$ the workload manager 108 maintains for each attribute type i, for attribute types 1 . . . n. A queue list $400_i$ for attribute i includes an identifier 402 identifying the queue list for the attribute type i; an attribute type 404 or attribute type i; and a queue pointer 406 identifying the last queue $300_{i,j}$ indicated in the list of work unit queues 408 processed for the attribute type 404. The list 408 of queues $300_{i,j}$ may be ordered according to an order in which indication of the queue $300_{i,j}$ was added to the queue list 400i, such as a last-in-first out (LIFO) ordering.

Figure 5:
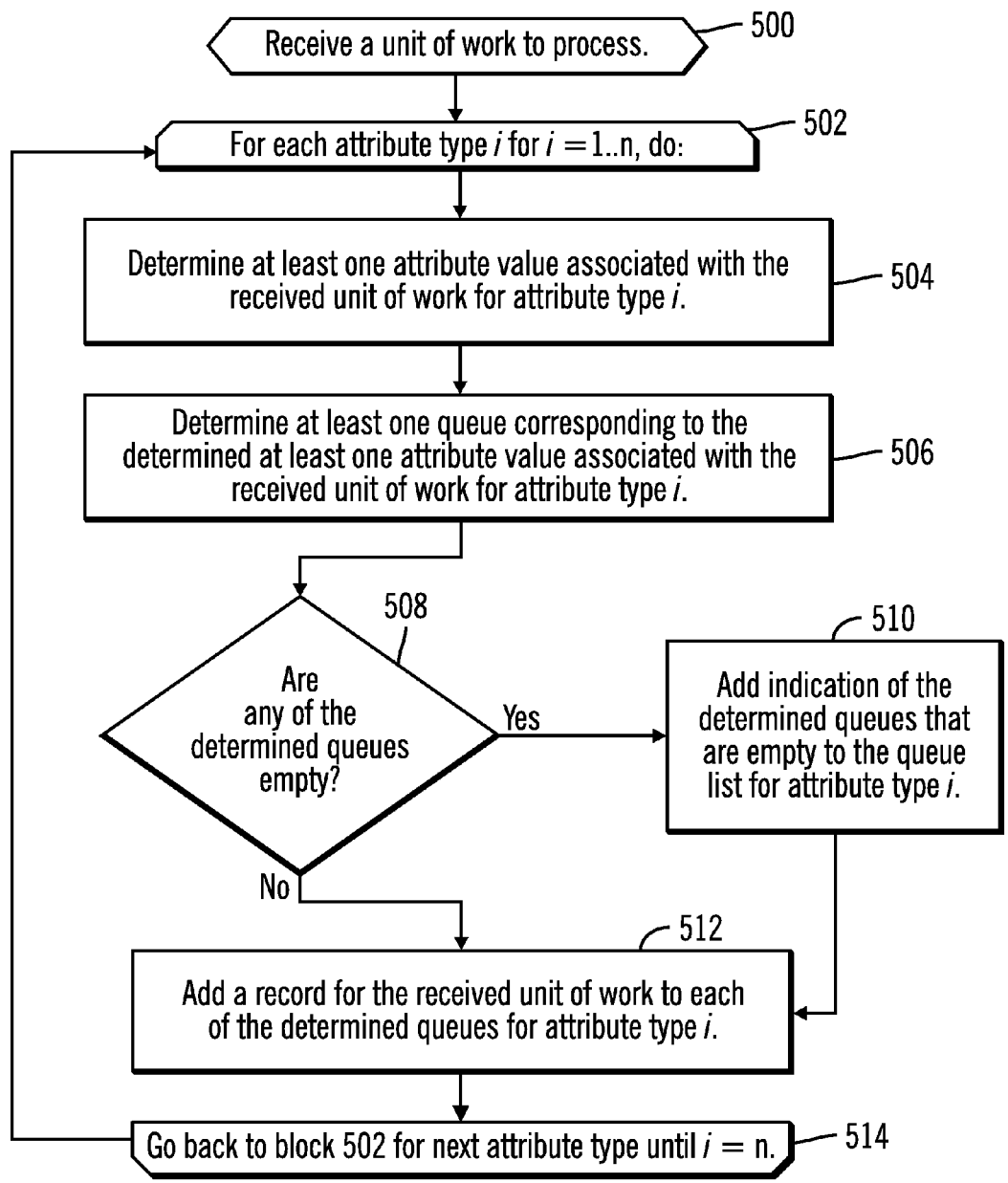
FIG. 5 illustrates an embodiment of operations to place a received unit of work on the queues.

FIG. 5 illustrates an embodiment of operations performed by the workload manager 108 to queue a new received unit of work 200 in the queues $300_{i,j}$. A loop of operations is performed at blocks 502 through 514 for each attribute type i of the n attribute types for which one or more attribute values are associated with the unit of work 200. At block 504, a determination is made of at least one attribute value $204_i$ associated with the received unit of work for attribute type i. The workload manager 108 then determines (at block 506) at least one queue $300_{i,j}$ corresponding to the determined at least one attribute value j (indicated in field 204i) of the received unit of work 200 for attribute type i. If (at block 508) any of the determined queues $300_{i,j}$ are empty, then the workload manager 108 adds (at block 510) indication of the determined queues that are empty to the queue list $400_i$ for attribute type i. The queue list $400_i$ indicates the queues $300_{i,j}$ for attribute i that have records to process. Thus, if a queue $300_{i,j}$ determined at block 506 is empty, then that would mean it is not on the appropriate queue list 400i and needs to be added because a record will soon be added to that queue $300_{i,j}$.

If (at block 508) no determined queue $300_{i,j}$ is empty or after adding indication of the empty queue to the queue list 408 for list $400_i$ (at block 510), the workload manager 108 adds (at block 512) a record for the received unit of work 200 to the queued records 308 for each of the determined queues $300_{i,j}$ for attribute type i. Control then proceeds back to block 502 until processing is performed for all n attribute types. In this way, a record for a unit of work may be added to multiple different queues for different attribute values and attribute types to allow for selection for processing by the workload manager 108 when processing the queues $300_{i,j}$.

Figure 6:
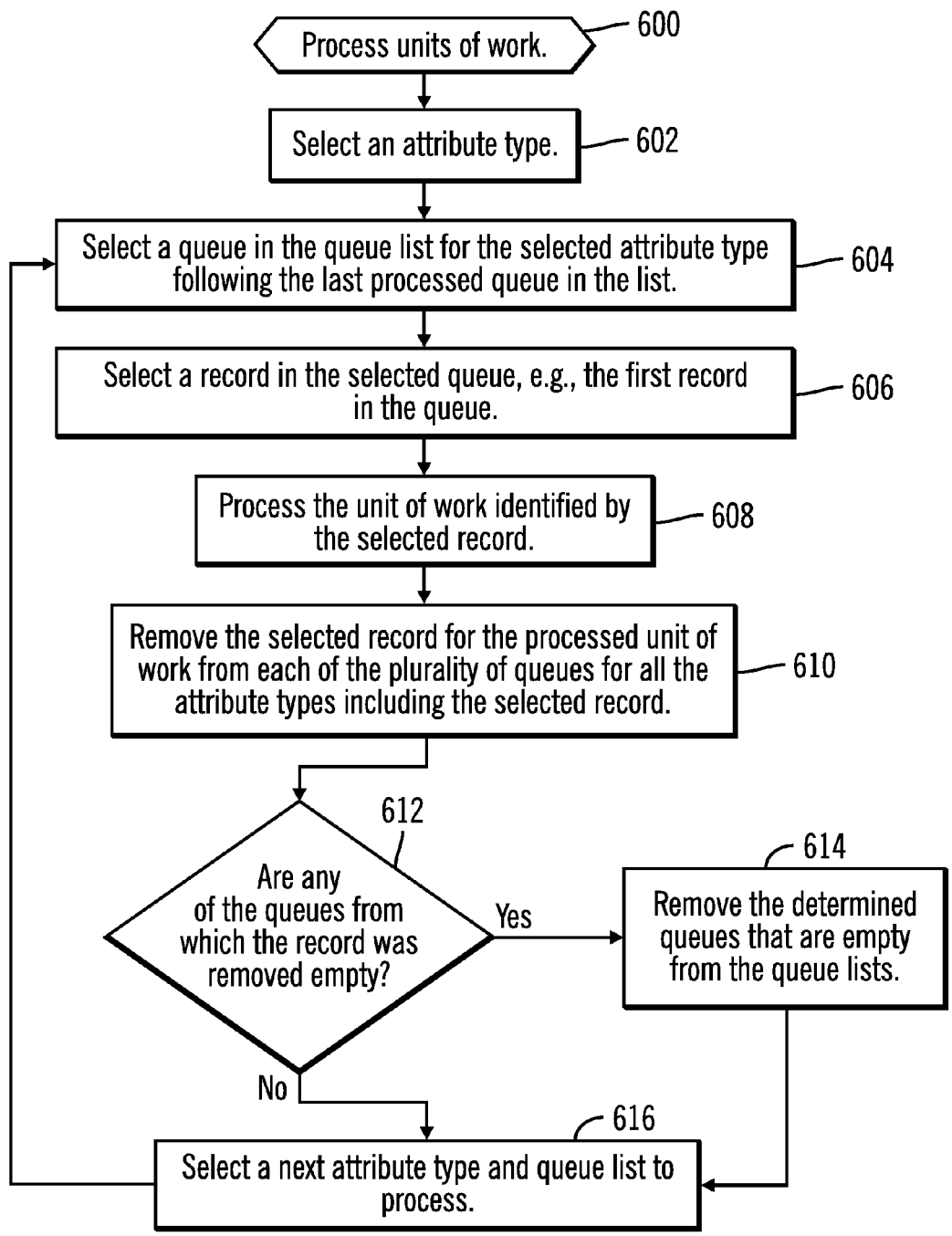
FIG. 6 illustrates an embodiment of operations to select a unit of work from one of the queues.

FIG. 6 illustrates an embodiment of operations performed by the workload manager 108 to process units of work 200 from the queues $300_{i,j}$. Upon initiating (at block 600) unit of work processing, the workload manager 108 selects an attribute type i. The workload manager 108 may select attribute types based on a cyclical or round robin algorithm to cycle through all possible attribute types before continuing the cycle from the start. Alternative techniques may be used to select an attribute type i. The workload manager 108 then selects (at block 604) a queue $300_{i,j}$ in the queue list $400_i$ for the selected attribute type i following the last processed queue in the list $400_i$, which may be identified by the queue pointer 404. A record is then selected (at block 606) from the queued records 304 in the selected queue $300_{i,j}$ which may comprise the first record in the queue. The workload manager 108 may then invoke an additional process to perform the work represented by selected record from the selected queue.

The workload manager 108 may then remove (at block 610) the selected record for the processed unit of work from each of the plurality of queues $300_{i,j}$ including the selected record for all the attribute types for i=1 . . . n. Thus, the record is removed from all the queues across all attribute types in which the record was previously included. The record removal operation may not occur until the unit of work represented by the record has completed processing. In alternative embodiments, the record may be removed after selection before the unit of work is performed or after performing only part of the unit of work. If (at block 612) any of the queues $300_{i,j}$ from which the record was removed have become empty as a result of the removal, then those empty queues $300_{i,j}$ are removed (at block 614) from the queue lists $400_i$ in which they were included for all attribute types. The workload manager 108 may then select (at block 616) a next attribute type (i+1) and corresponding queue list (i+1).

With the described embodiments of FIGS. 5 and 6, a record for a single unit of work is placed on multiple workload queues, or on each queue that corresponds to an attribute value for an attribute type associated with the unit of work. When the workload manager 108 then cycles through processing queues for different attribute types and values, that unit of work may be selected from any of the queues $300_{i,j}$ to which it was added. In this way, the selection of units of work 200 to process are balanced across the attribute types and attribute values associated with the unit of work.

Figure 7:
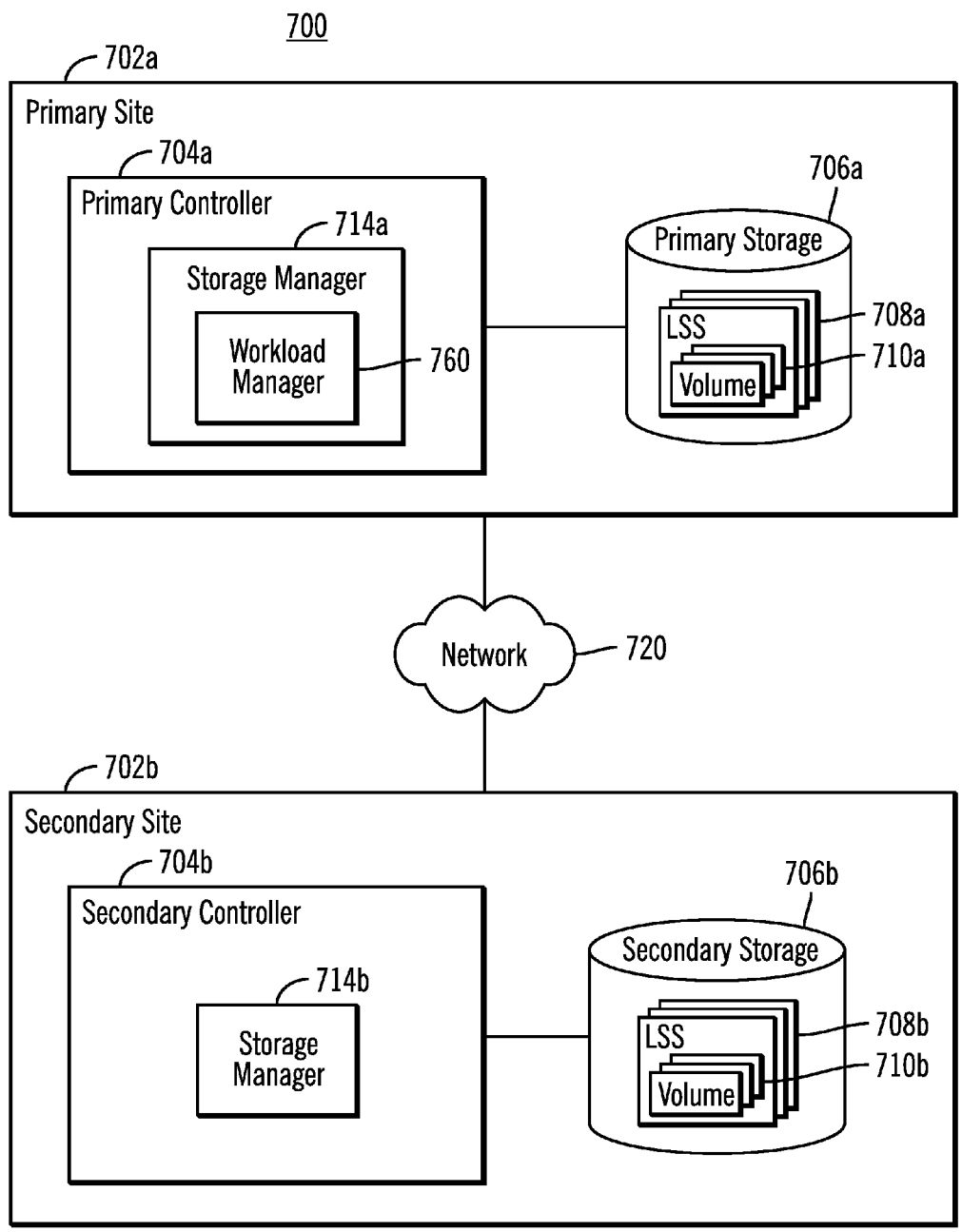
FIG. 7 illustrates an embodiment of a data storage environment.

FIG. 7 illustrates an embodiment of a storage environment 700 in which the workload manager 108 may be deployed, having a primary site 702a and a secondary site 702b, where the secondary site 702b provides a remote site backup of volumes and data at the primary site 702a. One or more primary controllers 704a at the primary site 702a manage primary storages 706a each having one or more logical subsystems (LSSs) 708a providing a grouping of one or more volumes 710a, which each volume 710a stores a plurality of extents of data. The primary controller 704a mirrors the volumes 710a in their LSSs 708a to a secondary controller 704b at the secondary site 702b over a network 720 to store in secondary volumes 710b in LSSs 708b at the secondary storage 706b at the secondary site 702b. In this way, there is a mirror relationship between primary site 702a volumes 710a and secondary site 702b volumes 710b. The primary controller 704a may implement the mirror relationship by copying all writes to extents in the volumes 710a to the secondary controller 704b to store in the secondary storage 706b.

The volumes 710a, 710b may be allocated extents of data configured in the storages 706a, 706b, respectively, where each extent is assigned blocks or tracks of data in the storages 706a, 706b.

The primary controller 704a includes a storage manager 714a for managing the transfer or migration of data transferred between hosts (not shown) and the primary storage 706a to the secondary controller 704b to store on the secondary storage 706b so that the secondary storage 706b mirrors the data in the primary storage 706a. In this way, writes to the primary storage 706a may be transferred to the secondary controller 704b to write to the secondary storage 706b. The secondary controller 704b also includes a storage manager 714b for managing the storage of data from the primary controller 704a and transfer of data with respect to hosts (not shown) to the secondary storage 706b.

The storage manager 714a may include a workload manager 760 that comprises an implementation of the workload manager 108 described above with respect to FIGS. 1-6 to manage data transfer operations of volumes as units of work to be queued in different queues based on attributes of the volumes 710a to be transferred.

The storages 706a and 706b may store data in a Redundant Array of Independent Disks (RAID) configuration. The storages 706a and 706b may each comprise one or more storage devices known in the art, such as interconnected storage devices, where the storage devices may comprise hard disk drives, solid state storage device (SSD) comprised of solid state electronics, such as a EEPROM (Electrically Erasable Programmable Read-Only Memory), flash memory, flash disk, Random Access Memory (RAM) drive, storage-class memory (SCM), etc., magnetic storage disk, optical disk, tape, etc. The network 720 may comprise one or more networks, such as one or more interconnected Local Area Networks (LAN), Storage Area Networks (SAN), Wide Area Network (WAN), peer-to-peer network, wireless network, etc.

Figure 8:
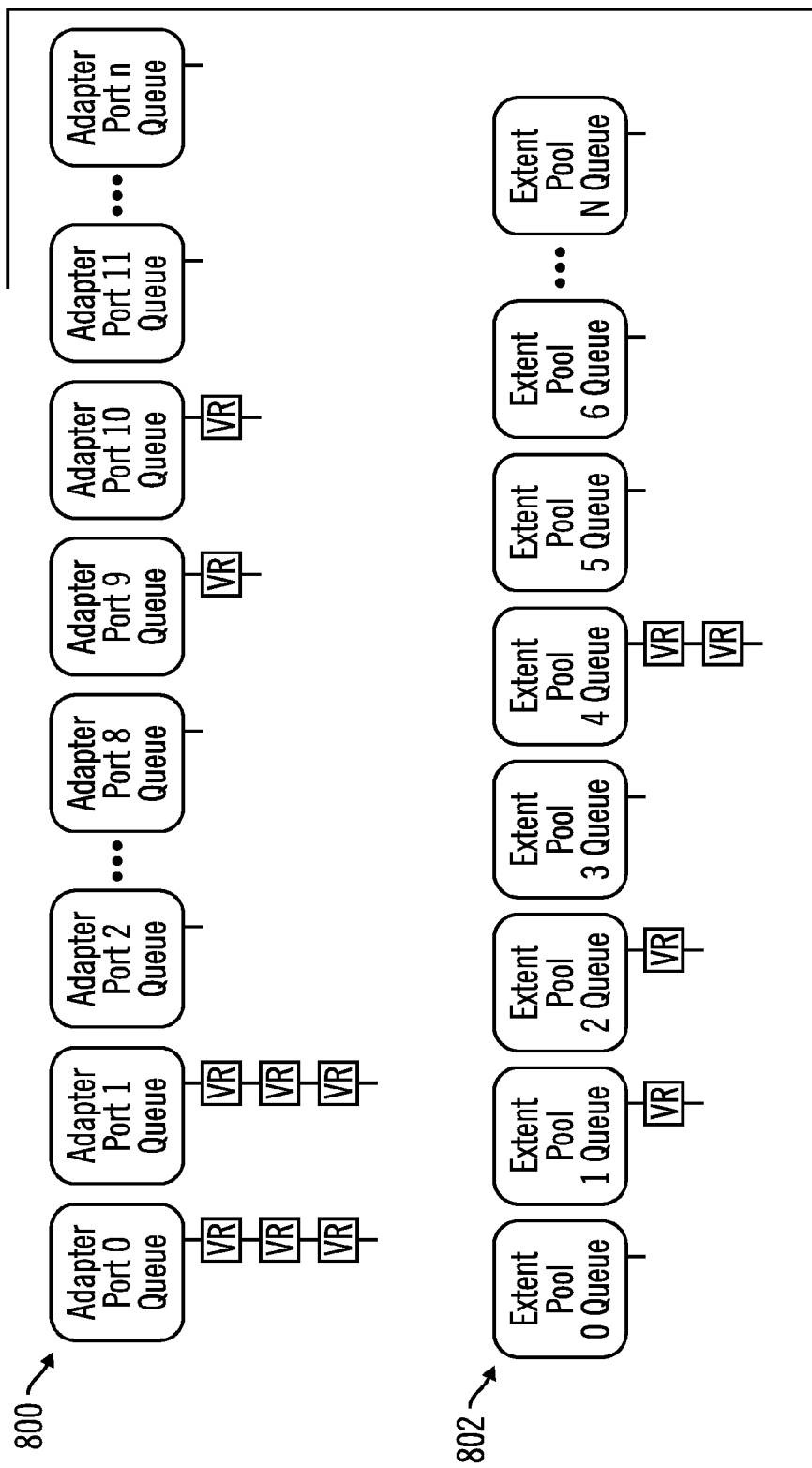
FIG. 8 illustrates an embodiment of queues used in a data storage environment.

FIG. 8 illustrates an embodiment of queues for two different attribute types, an adapter port type and an extent pool type. There are adapter port queues 800 having a queue for each possible adapter port in the primary controller 704*a* that may be used to form a path over which the volume can be transferred. The record (VR) for a volume to transfer may be added to each adapter port queue 800 for a port in the paths over which the particular volume may be transferred. There are a plurality of extent pool queues 802 for each possible extent pool, such that a record for a volume transfer operation, also referred to as a volume relationship record (VR) is added to each extent pool queue 802 for the extent pools from which the volume to transfer is allocated, because volumes are assigned to extent pools. The workload manager 760 may then cycle through processing the different adapter port queues 800 and extent pool queues 802 for the adapter port and extent pool attribute types to process records for volumes to transfer according to the operations of FIGS. 5 and 6.

There may also be queues for another attribute type, known as a resource group, where a resource group may identify a group of customers or quality of service requirements associated with the volume to transfer.

Figure 9:
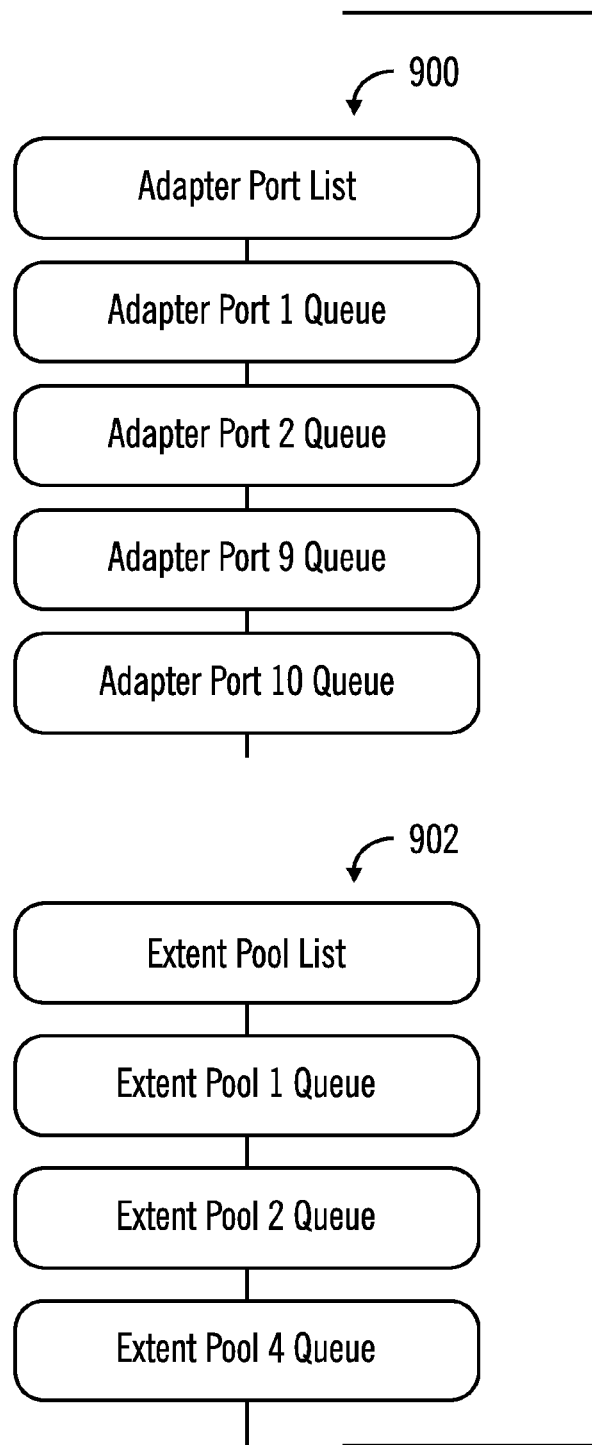
FIG. 9 illustrates an embodiment of queue lists used in a data storage environment.

FIG. 9 provides an embodiment of the queue lists 900 and 902 for the adapter port attribute type and the extent pool attribute type that include the non-empty adapter port queues 800 and extent pool queues 802 having records to process. The workload manager 760 may then alternate between cycling through these lists 900 and 902 as described with respect to FIG. 6 to determine adapter port queues 800 and extent pool queues 802 from which to select a volume relationship (VR) record to perform the transfer operation for the volume identified in the selected volume relationship record.

The described embodiments provide techniques to distribute units of work across different queues for attribute types and attribute type values associated with the unit of work, so that a record for one unit of work may be on multiple queues for the attribute types and attribute values associated with that unit of work. The workload manager may then cycle through processing the different queues to select a unit work from the first queue on which it is contained to balance the workload processing according to different attributes and attribute values of the unit of work.

The reference characters used herein, such as i, j, k, l, m, n, are used herein to denote a variable number of instances of an element, which may represent the same or different values, and may represent the same or different value when used with different or the same elements in different described instances.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 10:
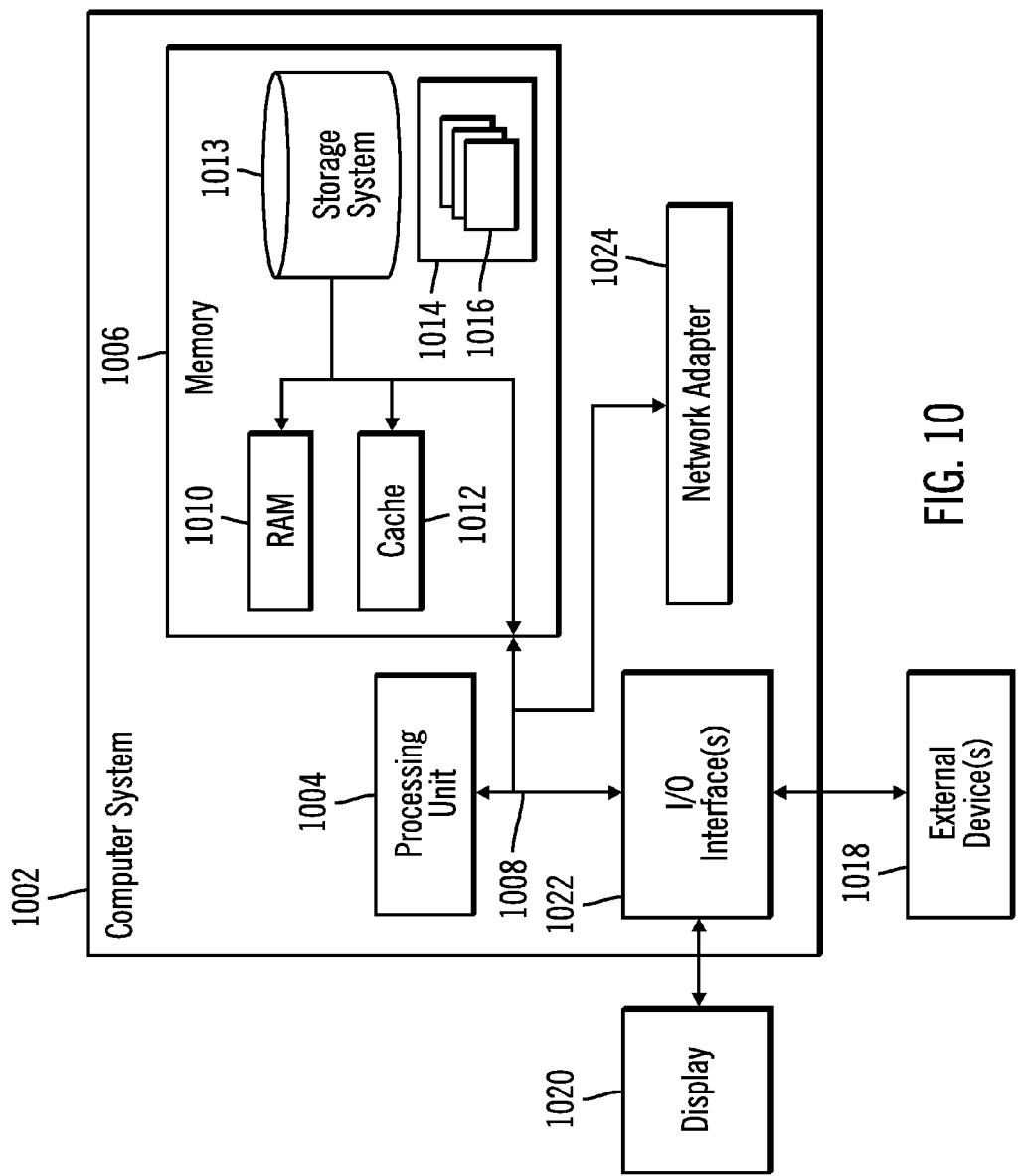
FIG. 10 illustrates a computing environment in which the components of FIGS. 1 and 7 may be implemented.

The computational components of FIG. 1, including the computing system 100 and FIG. 7 including the primary 704a and secondary 704b, controllers may be implemented in one or more computer systems, such as the computer system 1002 shown in FIG. 10. Computer system/server 1002 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1002 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 10, the computer system/server 1002 is shown in the form of a general-purpose computing device. The components of computer system/server 1002 may include, but are not limited to, one or more processors or processing units 1004, a system memory 1006, and a bus 1008 that couples various system components including system memory 1006 to processor 1004. Bus 1008 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1002 typically includes a variety of computer system readable media. Such media may be any available media that is accessible by computer system/server 1002, and it includes both volatile and non-volatile media, removable and non-removable media.

System memory 1006 can include computer system readable media in the form of volatile memory, such as random access memory (RAM) 1010 and/or cache memory 1012. Computer system/server 1002 may further include other removable/non-removable, volatile/non-volatile computer system storage media. By way of example only, storage system 1013 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1008 by one or more data media interfaces. As will be further depicted and described below, memory 1006 may include at least one program product having a set (e.g., at least one) of program modules that are configured to carry out the functions of embodiments of the invention.

Program/utility 1014, having a set (at least one) of program modules 1016, may be stored in memory 1006 by way of example, and not limitation, as well as an operating system, one or more application programs, other program modules, and program data. Each of the operating system, one or more application programs, other program modules, and program data or some combination thereof, may include an implementation of a networking environment. The components of the computer 1002 may be implemented as program modules 1016 which generally carry out the functions and/or methodologies of embodiments of the invention as described herein. The systems of FIG. 1 may be implemented in one or more computer systems 1002, where if they are implemented in multiple computer systems 1002, then the computer systems may communicate over a network.

Computer system/server 1002 may also communicate with one or more external devices 1018 such as a keyboard, a pointing device, a display 1020, etc.; one or more devices that enable a user to interact with computer system/server 1002; and/or any devices (e.g., network card, modem, etc.) that enable computer system/server 1002 to communicate with one or more other computing devices. Such communication can occur via Input/Output (I/O) interfaces 1022. Still yet, computer system/server 1002 can communicate with one or more networks such as a local area network (LAN), a general wide area network (WAN), and/or a public network (e.g., the Internet) via network adapter 1024. As depicted, network adapter 1024 communicates with the other components of computer system/server 1002 via bus 1008. It should be understood that although not shown, other hardware and/or software components could be used in conjunction with computer system/server 1002. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for selecting units of work to process in a computing system, wherein the computer program product comprises a computer readable storage medium having program instructions embodied therewith, the program instructions executable by a processor to cause operations, the operations comprising:
    maintaining a plurality of queues for each of a plurality of attribute types of attributes associated with the units of work to process, wherein there are queues for different possible attribute values for each of the attribute types, and wherein each of the queues are associated with one of the attribute types and one of the different possible attribute values for the associated attribute type, wherein there are multiple queues for the different possible attribute values for one of the attribute types;
    receiving a unit of work to process;
    determining a plurality of the queues corresponding to attribute values for at least one attribute type associated with the received unit of work;
    adding a record for the received unit of work to the determined plurality of queues for different attribute types or different attribute values of one attribute type; and
    alternating cycling through the queues for different attribute types and attribute values to select a unit of work from a first processed queue on which the unit of work is contained to balance workload processing according to different attribute types and attribute values of the unit of work.

2. The computer program product of claim 1, wherein the operations further comprise:
    selecting one of the attribute types;
    for the selected attribute type, selecting one of the queues;
    selecting a record in the selected queue; and
    processing the unit of work identified by the selected record.

3. The computer program product of claim 2, wherein the operations further comprise:
    removing the selected record for the processed unit of work from each of the plurality of queues in which the record is contained.

4. The computer program product of claim 2, wherein the selecting one of the attribute types comprises alternating selecting one of the attribute types to balance selection of the attribute types for selecting units of work to process based on attribute values of the attribute types.

5. The computer program product of claim 2, wherein the operations further comprise:
    maintaining a queue list for each attribute type indicating queues for the attribute type having records identifying the units of work to process, wherein the selecting one of the queues comprises alternating among selecting one of the queues indicated in the queue list for the selected attribute type.

6. The computer program product of claim 5, wherein the operations further comprise:
    removing the selected record for the processed unit of work from each of the plurality of queues for the attribute types;
    determining whether the queues from which the selected record was removed are empty or include records; and
    removing the queues that are determined to be empty from at least one queue list that includes the queues determined to be empty.

7. The computer program product of claim 5, wherein the operations further comprise:
    adding indication of the queues to the queue list that were empty when the record was added to the queues.

8. The computer program product of claim 1, wherein the units of work to process represent volumes to transfer from a primary storage to a secondary storage, wherein the attribute types include adapter ports over which the volume can be transferred and an extent pool from which the volume is allocated, wherein the queues comprise adapter port queues for the adapter ports and extent pool queues for the extent pools, wherein adapter port attribute values for each volume indicate the adapter ports assigned to transfer the volume, wherein extent pool attribute values for each volume indicate at least one extent pool from which the volume is allocated, and wherein the record for one volume to transfer is added to each of the adapter port queues for the adapter port attribute values for the volume and the extent pool queues for the extent pool attribute values for the volume.

9. The computer program product of claim 8, wherein a primary controller and secondary controller have adapter cards with adapter ports to transfer volumes from the primary storage to the secondary storage, wherein the record for one volume to transfer is added to each of the adapter port queues for adapter ports at the primary controller forming paths through which the volume can be transferred.

10. The computer program product of claim 8, wherein the attribute types include resource groups for different customer attributes that can be assigned to the volumes, wherein the queues comprise resource group queues for the resource groups, wherein resource group attribute values for each volume indicate the resource group associated with the volume, and wherein the record for one volume is added to each of the resource group queues for the resource group attribute values for the volume.

11. A system for selecting units of work to process in a computing system, comprising:
  a processor; and
  a computer readable storage medium having program instructions embodied therewith, the program instructions executable by the processor to cause operations, the operations comprising:
    maintaining a plurality of queues for each of a plurality of attribute types of attributes associated with the units of work to process, wherein there are queues for different possible attribute values for each of the attribute types, and wherein each of the queues are associated with one of the attribute types and one of the different possible attribute values for the associated attribute type, wherein there are multiple queues for the different possible attribute values for one of the attribute types;
    receiving a unit of work to process;
    determining a plurality of the queues corresponding to attribute values for at least one attribute type associated with the received unit of work;
    adding a record for the received unit of work to the determined plurality of queues for different attribute types or different attribute values of one attribute type; and
    alternating cycling through the queues for different attribute types and attribute values to select a unit of work from a first processed queue on which the unit of work is contained to balance workload processing according to different attribute types and attribute values of the unit of work.

12. The system of claim 11, wherein the operations further comprise:
  selecting one of the attribute types;
  for the selected attribute type, selecting one of the queues;
  selecting a record in the selected queue; and
  processing the unit of work identified by the selected record.

13. The system of claim 12, wherein the operations further comprise:
  removing the selected record for the processed unit of work from each of the plurality of queues in which the record is contained.

14. The system of claim 12, wherein the operations further comprise:
  maintaining a queue list for each attribute type indicating queues for the attribute type having records identifying the units of work to process, wherein the selecting one of the queues comprises alternating among selecting one of the queues indicated in the queue list for the selected attribute type.

15. The system of claim 14, wherein the operations further comprise:
  removing the selected record for the processed unit of work from each of the plurality of queues for the attribute types;
  determining whether the queues from which the selected record was removed are empty or include records; and
  removing the queues that are determined to be empty from at least one queue list that includes the queues determined to be empty.

16. The system of claim 11, wherein the units of work to process represent volumes to transfer from a primary storage to a secondary storage, wherein the attribute types include adapter ports over which the volume can be transferred and an extent pool from which the volume is allocated, wherein the queues comprise adapter port queues for the adapter ports and extent pool queues for the extent pools, wherein adapter port attribute values for each volume indicate the adapter ports assigned to transfer the volume, wherein extent pool attribute values for each volume indicate at least one extent pool from which the volume is allocated, and wherein the record for one volume to transfer is added to each of the adapter port queues for the adapter port attribute values for the volume and the extent pool queues for the extent pool attribute values for the volume.

17. A method for selecting units of work to process in a computing system, comprising:
  maintaining a plurality of queues for each of a plurality of attribute types of attributes associated with the units of work to process, wherein there are queues for different possible attribute values for each of the attribute types, and wherein each of the queues are associated with one of the attribute types and one of the different possible attribute values for the associated attribute type, wherein there are multiple queues for the different possible attribute values for one of the attribute types;
  receiving a unit of work to process;
  determining a plurality of the queues corresponding to attribute values for at least one attribute type associated with the received unit of work;
  adding a record for the received unit of work to the determined plurality of queues for different attribute types or different attribute values of one attribute type; and
  alternating cycling through the queues for different attribute types and attribute values to select a unit of work from a first processed queue on which the unit of work is contained to balance workload processing according to different attribute types and attribute values of the unit of work.

18. The method of claim 17, further comprising:
  selecting one of the attribute types;
  for the selected attribute type, selecting one of the queues;
  selecting a record in the selected queue; and processing the unit of work identified by the selected record.

19. The method of claim 18, further comprising:
removing the selected record for the processed unit of work from each of the plurality of queues in which the record is contained.

20. The method of claim 18, further comprising:
maintaining a queue list for each attribute type indicating queues for the attribute type having records identifying the units of work to process, wherein the selecting one of the queues comprises alternating among selecting one of the queues indicated in the queue list for the selected attribute type.

21. The method of claim 20, further comprising:
removing the selected record for the processed unit of work from each of the plurality of queues for the attribute types;
determining whether the queues from which the selected record was removed are empty or include records; and
removing the queues that are determined to be empty from at least one queue list that includes the queues determined to be empty.

22. The method of claim 17, wherein the units of work to process represent volumes to transfer from a primary storage to a secondary storage, wherein the attribute types include adapter ports over which the volume can be transferred and an extent pool from which the volume is allocated, wherein the queues comprise adapter port queues for the adapter ports and extent pool queues for the extent pools, wherein adapter port attribute values for each volume indicate the adapter ports assigned to transfer the volume, wherein extent pool attribute values for each volume indicate at least one extent pool from which the volume is allocated, and wherein the record for one volume to transfer is added to each of the adapter port queues for the adapter port attribute values for the volume and the extent pool queues for the extent pool attribute values for the volume.

* * * * *